June 7, 1960  A. H. FRÖHLICH ET AL  2,939,503
BUILDING PLY FOR PNEUMATIC TIRES
Filed Jan. 16, 1956  2 Sheets-Sheet 1

INVENTORS
ADOLF FRÖHLICH &
EDWARD J. HARRIS
BY
ATTORNEY

INVENTORS
ADOLF FRÖHLICH &
EDWARD J. HARRIS
BY
*J. William Freeman*
ATTORNEY

2,939,503
BUILDING PLY FOR PNEUMATIC TIRES

Adolf H. Fröhlich, Hannover, Germany, and Edward J. Harris, Akron, Ohio, assignors to The Cleveland Trust Company, Cleveland, Ohio, as trustee Filed Jan. 16, 1956, Ser. No. 559,245

3 Claims. (Cl. 152—354)

This invention relates to pneumatic tire manufacture, and in particular has reference to improvement of the conventional building ply normally employed in the construction and manufacture of pneumatic tires.

In the manufacture of pneumatic tires, one of the basic structural members utilized is a thin sheet or layer of uncured rubber-like material, known conventionally as a fabric or building ply. This ply material has parallel fabric cord members embedded therein for giving rigidity to the tire body, and as is well known in the prior art, these cords run transversely of the rubber-like sheet in parallel relationship with each other, and are disposed at a bias angle across the ply sheet. In this manner, these plies can be alternated in known manner to have successively applied cord members criss-crossed with respect to each other for the purpose of giving the tire added strength, with several of such plies being applied about a building drum in making a single pneumatic tire.

It is believed axiomatic at the present time, that the load-bearing properties of a pneumatic tire, as well as the operating life thereof, are directly proportionate to the strength of the cord members employed therein. It is well established, for example, that tire failure, such as blowouts, etc., can normally be traced to a failure of the cord members in the ruptured area. It follows that increased cord strength would result in the production of a tire that has a greater load resistance, as well as longer wearing properties. It has been theorized that if wire cord members, for example, could be commercially employed in the manufacture of pneumatic tires, that these tires would have an unlimited life, in view of the fact that the tread portion thereof could be replaced to compensate for wear in the same.

It is also believed apparent that if the strength of the individual cords was increased that a lesser number of such cords would give a tire body the same strength as is now obtained with a considerably greater number of cords. Thus, it has been found that a single building ply having wire cords therein will provide a tire body having equivalent or greater strength than a tire body produced by conventional methods, wherein a plurality of fabric plies are employed.

It has also been discovered that if this single ply is made wider in transverse width than normal, that the portions thereof that extend beyond the bead rings may be turned up to form the exterior portion of the side wall area. By further increasing the above width this turnover can be extended so that the opposed edge portions thereof will overlap at the crown area to thus be located under the tread stock to be applied. In this manner, the turned-over portions will eliminate the need for the usual breaker and chafer strips that are located in these areas.

As an additional feature, it has further been discovered that if the building ply is laminated or otherwise formed in a plurality of layers that improved results will occur, in view of the fact that thickness and/or composition of the innermost layer may be varied to suit particular requirements as needed. Thus, for example, by making this inner layer of the building ply of a thickened butyl composition, the same would serve as an air-impervious inner liner, as well as a smooth and finished exterior side wall.

It accordingly becomes the principal object of this invention to provide a building ply for pneumatic tires that is characterized by the presence of high strength cord members embedded between layers of rubber-like material.

It is a further object of this invention to provide such a building ply in enlarged transverse width, whereby integral portions thereof can be folded over the bead rings of the tire to eliminate the need for breaker and chafer strips.

These and other objects of the invention will become more apparent upon a reading of the following brief specification, considered and interpreted in the light of the accompanying drawings.

Figure 1:
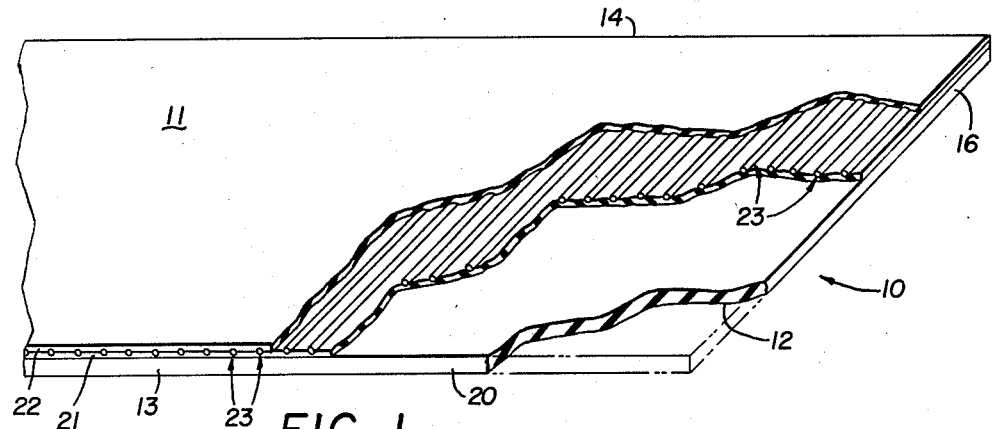
Figure 1 is a perspective view of a single improved ply, having portions thereof broken away to more clearly illustrate the structure of the same.
Figure 2:
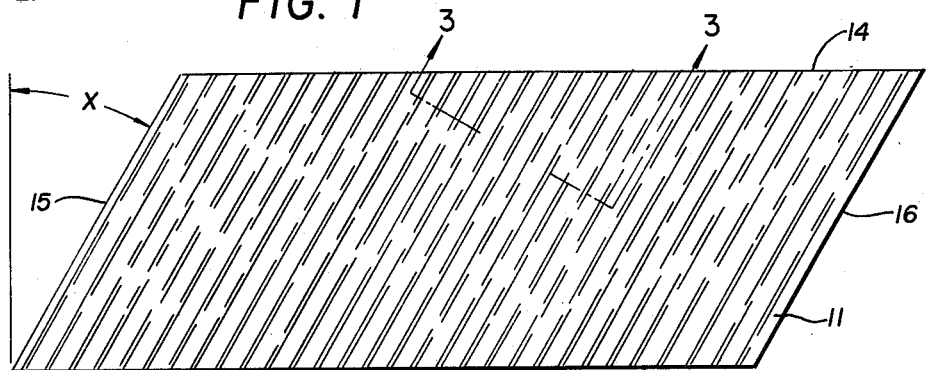
Figure 2 is a plan view of the improved fabric ply.
Figure 3:
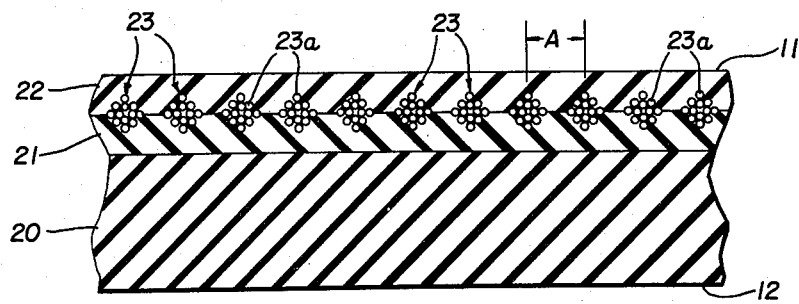
Figure 3 is a section taken on the lines 3—3 of Figure 2.

Referring now to the drawings, and in particular to Figures 1 to 3 thereof, the improved building ply is shown in the form of an elongated sheet 10 that has a top surface 11, a bottom surface 12, and transversely spaced, parallel longitudinal edge portions 13 and 14.

In Figure 2, this sheet 10 has been severed into an elongated quadrilateral by effectuating a bias cut of the same, in known manner. Such cutting action has defined a leading transverse edge portion 15 and a trailing transverse edge portion 16.

In the preferred embodiment of the invention as is illustrated in Figures 1 to 3 of the drawings, the sheet 10 is shown as comprising a plurality of layers 20, 21 and 22 that are laminated together so as to have the cord members 23, 23 disposed between the layers 21 and 22 in embedded relationship therebetween. While the cord members 23, 23 are embedded between the layers 21 and 22 in side-by-side relationship as shown, it is to be noted that each cord member 23 may be defined by a plurality of strands 23a, 23a. In this manner, the number of strands, as well as the number of cords, may be varied to provide tires having different strength characteristics. By use of such an arrangement, it is believed apparent, for example, that each cord member 23 could have a greater or lesser number of strands 23a, 23a than the twelve-strand arrangement that is illustrated in Figure 3. Similarly, to increase or decrease the overall strength of a pneumatic tire, it is believed apparent that the spacing between the adjacent cords 23, 23, as indicated by the dimension "A" in Figure 3 of the drawings, could be increased or decreased. In this manner, the number of strands 23a, 23a and the number of cords 23, 23 that occur in each longitudinal inch of sheet material 10, determines the strength of the tire body as required.

In addition to the aforementioned structural characteristics, it is to be noted that the cords 23, 23 are conventionally disposed transversely of the sheet 10, on a bias angle. This bias angle, indicated by the numeral "X" in Figure 2 of the drawings, is shown approximating 36 degrees, although it is to be understood that the angle "X" could fall between "0" degrees and 40 degrees without materially affecting the results as is well known in the prior art.

Considering next the structural characteristics of the individual layers 20, 21 and 22 that are illustrated in the preferred form of the invention as defining the laminated sheet 10, attention is first directed to the fact that these individual layers may vary in composition and thickness. Thus, the layers 21 and 22 may be of similar composition as illustrated, while the layer 20 may be conveniently made in different thickness and from another composition or mix which includes, for example, a high content of butyl or neoprene therein. In this manner, a tire being built can have the layer 20 serve as an air-impervious inner liner of the type normally found in tubeless tires. By incorporating this butyl liner in the fabric ply per se, the current practice of applying the butyl liner before the building of the tire is completed, is obviously simplified as a result of the elimination of this added step.

As has been indicated above and as is shown in Figure 3, the various layers 20, 21 and 22 may vary in thickness. In the preferred form of Figure 3, the layer 20 is shown as being thicker than the combined thickness of the layers 21 and 22, which are shown as being approximately equal in thickness. It is to be understood in this regard, that the specification is not limited to any particular thickness with respect to the layers 20, 21 and 22, in view of the fact that thickness and composition of these layers could obviously be varied to achieve desired results. For example, in this regard, it is well known that the harder the composition of the rubber compound used, the more load-bearing properties the same will have; and accordingly, if load-bearing properties were an important feature of the invention, it is apparent that the composition of the layers 20, 21 and 22 could be made harder than normal to achieve such properties. Similarly, if the tires were to be used as tubeless tires as above indicated, it is apparent that the layer 20 could be made of a high butyl or neoprene content so as to effectuate an inner sealing liner. By like token, while the layers 21 and 22 are shown as being approximately equal in thickness, it is to be understood that these could be varied so as to be unequal in thickness without departing from the scope of the teachings of this invention.

Figure 4:
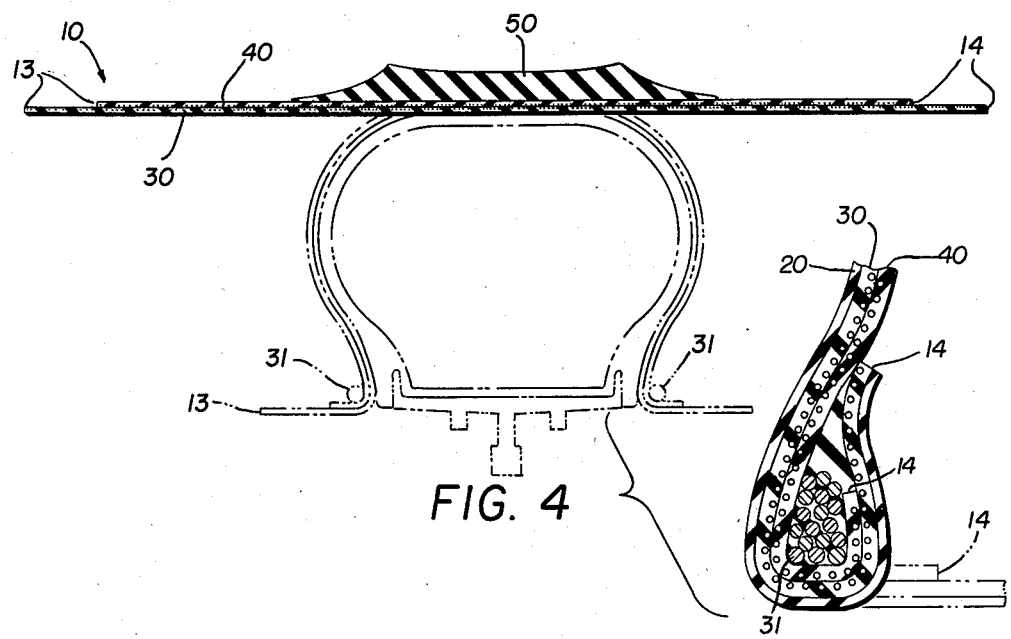
Figure 4 is a sectional view illustrating the use of the improved fabric ply in one method of manfacturing pneumatic tires.
Figure 5:
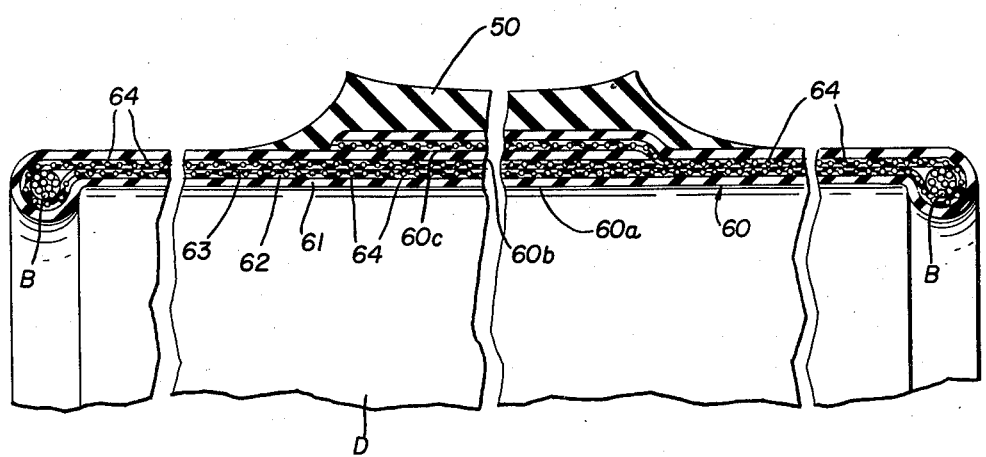
Figure 5 is a similar view illustrating the use of the improved building ply in connection with another method of manufacturing pneumatic tires.

In Figures 4 and 5 of the drawings, there is disclosed the use of the improved building ply 10 in connection with two currently known forms of building a pneumatic tire. The form of tire building equipment used illustrated in connection with Figure 4 of the drawings, contemplates the use of the "round building" tire machine of the type set forth in U.S. Patent 2,503,815, issued to Adolf Frohlich on April 11, 1950. In Figure 5, a single ply fabric is shown employed in connection with the conventional building drum that results in the creation of what has been traditionally referred to as a "flat-built" tire, that could optionally include the provision for a "low shoulder."

In the pneumatic tire being built according to the schematic illustration shown in Figure 4 of the drawings, a pair of fabric plies indicated as 30 and 40 are respectively applied over a split building drum that has a cylindrical configuration, with wider ply 30 being the inner ply, while ply 40 will be designated as the outer ply. A tread stock 50 is applied over the superimposed plies 30 and 40, and as shown in full lines in Figure 4 of the drawings, the inner ply 30 has a considerably wider distance between the longitudinal edge portions 13 and 14 thereof, than does the ply 40. When the above assembled component parts are positioned on the drum of a round stretching machine of the type set forth in the above discussed Frohlich patent, these longitudinal edge portions 13 and 14 of the respective plies 30 and 40 are gripped by a plurality of gripping arms that upon gripping, retract in a curvilinear path so as to uniformly move these edge portions to the chain-dotted line position of Figure 4 of the drawings.

In the chain-dotted line position, it will be noted that the area adjacent the edge portions 13 and 14 have been turned about bead members 31, 31, so that the same may be switched against the radial side wall of the tire for a considerable distance to form an external side wall and additionally insure that the beads 31, 31 will not be displaced during subsequent operations, as well as in normal usage thereof.

It will be noted that in Figure 4 of the drawings, which has a preferred application in the manufacture of heavy duty truck tires, for example, that two fabric plies and one tread stock are the only component pieces used in making the pneumatic tire illustrated in chain-dotted lines. It will be noted that these component parts produce a completely finished tire, and that the use of a butyl layer 20 in ply 30, for example, permits this layer 20 to be disposed over the exterior side wall surface of the tire, as well as covering the inner wall of the tire. In this manner, the tire may be used as a tubeless tire, with the layer 20, for example, of the innermost ply 30 serving as an impervious liner.

In the embodiment of pneumatic tire manufacture illustrated in connection with Figure 5 of the drawings, the formation of a "flat-built" tire by use of a single fabric ply 60 that is of the type previously discussed in connection with Figures 1 to 3 of the drawings, and which includes a central portion 60a and marginal edge portions 60b and 60c.

Accordingly, this fabric ply 60 is shown as a laminated sheet having an inner layer 61, an intermediate layer 62, and an outer layer 63, with cords 64, 64 being disposed between the layers 62 and 63. As shown in Figure 5, the central portion 60a of the fabric ply 60 is disposed over the outer periphery of a drum D so that the layer 61 is in contact with the exterior surface of the drum D. Adjacent the opposed axial ends of the drum D are provided the usual bead members B, B, about which are folded the marginal edge portions 60b and 60c of the fabric ply 60, with marginal portion 60a being shown folded over first, while the marginal portion 60b is folded over the right-hand bead B of Figure 5 so as to overlap the previously folded marginal portion 60a.

In this condition, it is apparent that the folded marginal portions 60a and 60b will have the layer 61 thereof disposed on the exterior of the tire, and it is apparent that a tread T could be applied over the folded over edges of the portions 60a and 60b to provide a complete pneumatic tire.

Such a tire as is above described, would be characterized by extreme strength in view of the wire cord members 64, 64 that are provided therein, and would be further characterized by the presence of an air-impervious liner created by use of butyl or neoprene compound in the layer 61 as previously described. Similarly, the exteriorly presented surfaces of the folded over marginal portions 60a and 60b will be defined by this same layer 61; and in addition, it will be noted that the overlapping of the marginal edge portions 60a and 60b provides the requisite thickened crown and side-wall portions that replace the breaker and chafer strips normally employed in pneumatic tire construction. It will be seen that a single building ply has been used in connection with bead rings B, B and tread stock 50 to produce a pneumatic tire having a far fewer number of component parts.

It will be seen from the foregoing that there has been provided a new and novel type of building ply for use in connection with the manufacture of pneumatic tires. In the specification describing this ply certain specific terminology has been used, including phraseology such as "rubber-like" and "cord members," and it is to be understood that the phrase "rubber-like" includes all rubber compositions or synthetic rubber compositions that are usable in the art of pneumatic tire manufacture; and similarly where the term "cord" is used the intended scope includes both fabric, nylon and wire cord members. It is also to be understood that while Figures 4 and 5 illustrated pneumatic tires made from two and one ply respectively, that different numbers of similar plies could be used in either case, if required.

It accordingly follows that modifications of the invention may be resorted to without departing from the spirit hereof or the scope of the appended claims.

What is claimed is:

1. A pneumatic tire including a tread portion, opposed bead rings and a single building ply wrapped around said beads and being overlapped beneath said tread; said single building ply being defined by a plurality of layers of rubber-like material laminated together with wire cord members being disposed therebetween; said building ply having opposed parallel planar surfaces; said wire cord members being located in parallelism with said surfaces and being disposed in spaced relationship therewith; said layers being of different thickness, with said thicker layer being of butyl composition and defining the internal surface of said tire and the external side wall surface thereof:

2. A pneumatic tire including a tread portion, opposed bead rings and a single building ply wrapped around said beads and being overlapped beneath said tread, whereby the external sidewall surface of said tire is defined by overlapped portions of said ply; said ply including wire cord members positioned between first and second laminated layers of rubber-like material; the innermost layer of said ply having bonded thereto a layer of butyl composition; said butyl layer being thicker than either of said first and second layers, whereby the same will serve as an internal air impervious liner and an exterior sidewall surface.

3. A pneumatic tire of the character described, comprising; a body section defined by opposed bead rings and a single building ply; a tread section superimposed on said body section in the crown region thereof and blending into the outer sidewall region of said body adjacent the radially outermost surface of said sidewall area of said body section; said single building ply being folded over said opposed bead rings and having the opposed ends thereof overlapped beneath said tread section and over the central portion, with said overlapped portions extending over the full width of the tread, said building ply having wire cord elements imparted between the opposed faces thereof; said wire cord elements extending diagonally thereof.

References Cited in the file of this patent

UNITED STATES PATENTS

| | | |
|---|---|---|
| 2,277,145 | Pierce | Mar. 24, 1942 |
| 2,499,724 | Compton | Mar. 7, 1950 |
| 2,541,550 | Sarbach et al. | Feb. 13, 1951 |
| 2,650,642 | Reheiser | Sept. 1, 1953 |
| 2,679,277 | Gray | May 25, 1954 |
| 2,754,887 | Wykoff | July 17, 1956 |

FOREIGN PATENTS

| | | |
|---|---|---|
| 595,158 | France | July 10, 1925 |